United States Patent
Arai et al.

(10) Patent No.: US 6,970,344 B2
(45) Date of Patent: Nov. 29, 2005

(54) STACKED SOLID ELECTROLYTIC CAPACITOR AND STACKED TRANSMISSION LINE ELEMENT

(75) Inventors: Satoshi Arai, Sendai (JP); Yoshihiko Saiki, Sendai (JP); Sadamu Toita, Sendai (JP); Takayuki Inoi, Sendai (JP)

(73) Assignee: NEC Tokin Corporation, Sendai (JP)

( * ) Notice: Subject to any disclaimer, the term of this patent is extended or adjusted under 35 U.S.C. 154(b) by 19 days.

(21) Appl. No.: 10/779,025

(22) Filed: Feb. 13, 2004

(65) Prior Publication Data

US 2004/0174660 A1 Sep. 9, 2004

(30) Foreign Application Priority Data

Mar. 4, 2003 (JP) ......................................... 2003-056535

(51) Int. Cl.⁷ ............................ H01G 9/04; H01G 4/228
(52) U.S. Cl. ...................... 361/528; 361/532; 361/540; 29/25.03
(58) Field of Search ................................ 361/523–524, 361/528–529, 532–535, 538, 540, 541; 29/25.03

(56) References Cited

U.S. PATENT DOCUMENTS

| | | | |
|---|---|---|---|
| 5,377,073 A | | 12/1994 | Fukaumi et al. |
| 6,392,869 B2 | * | 5/2002 | Shiraishi et al. ............ 361/523 |
| 6,400,556 B1 | * | 6/2002 | Masuda et al. ............. 361/523 |
| 6,563,693 B2 | * | 5/2003 | Nakada et al. ............. 361/523 |
| 2003/0039093 A1 | | 2/2003 | Tadanobu et al. |
| 2004/0027789 A1 | * | 2/2004 | Kochi et al. ................ 361/523 |
| 2004/0160729 A1 | * | 8/2004 | Kochi et al. ................ 361/528 |

FOREIGN PATENT DOCUMENTS

| | | | | |
|---|---|---|---|---|
| JP | 05217811 | * | 8/1993 | ............ H01G/9/05 |
| JP | 8-115855 A | | 5/1996 | |
| JP | 10-144573 A | | 5/1998 | |
| JP | 11-135367 A | | 5/1999 | |

OTHER PUBLICATIONS

Related U.S. Appl. No. 10/920,069, filed Aug. 17, 2004; Inventor: S. Arai et al.; Title: Laminated Solid Electrolytic Capacitor and Laminated Transmission Line Device Increased in Element Laminating Number Without Deterioration of Elements.

* cited by examiner

*Primary Examiner*—Eric Thomas
(74) *Attorney, Agent, or Firm*—Frishauf, Holtz, Goodman & Chick, P.C.

(57) ABSTRACT

In a stacked solid electrolytic capacitor or a stacked transmission line element, anode portions of adjacent elements are electrically and mechanically connected to each other by the use of connecting members each in the form of a conductive adhesive or solderable metal, via metal plates connected to the anode portions so as to sandwich therebetween the anode portions, respectively, from the upper and lower surfaces thereof. On the other hand, cathode portions of the adjacent elements are electrically and mechanically connected to each other by a conductive adhesive, or are electrically and mechanically connected to each other by the use of adhesive insulating sheets each having a hollowed portion and a conductive adhesive filled in the hollowed portions, or are adhered to each other by adhesive insulating sheets, then electrically connected to each other by a conductive adhesive applied onto side surfaces of the cathode portions.

18 Claims, 10 Drawing Sheets

STACKED SOLID ELECTROLYTIC CAPACITOR AND STACKED TRANSMISSION LINE ELEMENT

This application claims priority to prior Japanese application JP 2003-56535, the disclosure of which is incorporated herein by reference.

BACKGROUND OF THE INVENTION

The present invention relates to a stacked solid electrolytic capacitor and a stacked transmission line element.

A conventional solid electrolytic capacitor element is provided with a valve metal body at a central portion thereof. The valve metal body is formed by roughening, through etching, the surface of a metal plate made of an elementary substance of metal having a valve function, such as aluminum, tantalum, niobium, or titanium, or an alloy thereof, or formed by integrating together, through sintering, a metal plate having a valve function and metal powder having a valve function.

The solid electrolytic capacitor element has a structure wherein an oxide film is formed on the surface of the valve metal body, then insulating resin is formed thereon to divide a region into two regions, and then, in the region that will serve as a cathode portion, a solid electrolyte layer, a graphite layer, and a silver paste layer, or a solid electrolyte layer, a graphite layer, and a metal plating layer, or a solid electrolyte layer and a metal plating layer are stacked in the order named.

On the other hand, a conventional transmission line element is provided at a central portion thereof with a valve metal body like that of the solid electrolytic capacitor element. The transmission line element has a structure wherein an oxide film is formed on the surface of the valve metal body, then insulating resin is formed thereon to divide a region into three regions, and then, in the central region that will serve as a cathode portion, a solid electrolyte layer, a graphite layer, and a silver paste layer, or a solid electrolyte layer, a graphite layer, and a metal plating layer, or a solid electrolyte layer and a metal plating layer are stacked in the order named.

For achieving reduction in size, increase in capacity, and reduction in impedance with respect to the foregoing conventional solid electrolytic capacitor element or transmission line element, it is effective to stack a plurality of solid electrolytic capacitor elements or transmission line elements in a thickness direction and electrically connect them together.

The conventional stacking technique is disclosed in, for example, JP-A-H11-135367 (hereinafter referred to as "reference 1"). In a conventional stacked solid electrolytic capacitor, cathode portions are connected to each other via a conductive adhesive interposed therebetween, while anode portions are individually joined to a lead frame by resistance welding.

In the conventional stacking technique, however, inasmuch as the anode portions of the respective elements are joined to the lead frame, there has been a problem that when increasing the number of the stacking elements, the anode portion of the element located outermost is largely deformed to thereby degrade a characteristic of the element, and therefore, the number of the stacking elements may be two at maximum.

SUMMARY OF THE INVENTION

Therefore, it is an object of the present invention to provide a stacked solid electrolytic capacitor and a stacked transmission line element each preventing deformation of anode portions thereof and thus preventing degradation of a characteristic thereof caused by such deformation, even in a multi-stacked structure.

Specifically, according to one aspect of the present invention, there is provided a stacked solid electrolytic capacitor formed by stacking together a plurality of solid electrolytic capacitor elements each having a substantially flat plate shape and each comprising a plate-like anode portion forming one end portion, and a cathode portion divided from the anode portion by an insulator, wherein each of the solid electrolytic capacitor elements has a conductive member connected to the anode portion thereof so as to sandwich two principal surfaces of the anode portion, and the conductive members of the adjacent solid electrolytic capacitor elements are electrically and mechanically connected to each other by the use of one of a conductive adhesive, solderable metal, and welding so as to be stacked in layers.

According to another aspect of the present invention, there is provided a stacked transmission line element formed by stacking together a plurality of transmission line elements each comprising two anode portions having a substantially flat plate shape and forming both end portions, and a cathode portion provided between the anode portions, wherein each of the transmission line elements has a conductive member connected to each anode portion thereof so as to sandwich two principal surfaces of the anode portion, and the conductive members of the adjacent transmission line elements are electrically and mechanically connected to each other by the use of one of a conductive adhesive, solderable metal, and welding so as to be stacked in layers.

In the stacked solid electrolytic capacitor or the stacked transmission line element of the present invention, it may be arranged that each of the foregoing conductive members comprises a metal plate connected to each anode portion so as to sandwich it from both upper and lower surfaces thereof, and the adjacent metal plates are electrically and mechanically connected to each other by the use of the conductive adhesive, the solderable metal, or the welding so as to be stacked in layers.

It may also be arranged that each of the foregoing conductive members comprises metal plating layers formed on both surfaces of each anode portion, and the adjacent metal plating layers are electrically and mechanically connected to each other by the use of the conductive adhesive, the solderable metal, or the welding so as to be stacked in layers.

It may also be arranged that each of the foregoing conductive members comprises conductive paste layers formed on both surfaces of each anode portion, and the adjacent conductive paste layers are electrically and mechanically connected to each other by the use of the conductive adhesive or the solderable metal so as to be stacked in layers.

On the other hand, with respect to the cathode portions, it may be arranged that the adjacent cathode portions are connected to each other by the use of a conductive adhesive so as to be stacked in layers.

It may also be arranged that the adjacent cathode portions are connected to each other by the use of an adhesive insulating sheet having a hollowed portion and a conductive adhesive filled in the hollowed portion, so as to be stacked in layers.

Further, it may also be arranged that the adjacent cathode portions are adhered to each other by the use of an adhesive insulating sheet so as to be stacked in layers, and electrically connected to each other by the use of a conductive adhesive on side surfaces of the cathode portions.

According to still another aspect of the present invention, there is provided a method of manufacturing a stacked transmission line element which has a structure formed by stacking together a plurality of transmission line elements each comprising two anode portions having a substantially flat plate shape and forming both end portions, and a cathode portion provided between the anode portions. In the aspect of the present invention, the method comprises the steps of preparing at least two of the transmission line elements each has a conductive member; connecting the conductive member to each anode portion thereof so as to sandwich two principal surfaces of the anode portion; electrically and mechanically connecting the conductive members of the adjacent transmission line elements to each other by the use of one of a conductive adhesive and a solderable metal; and welding them so as to be stacked in layers.

According to yet another aspect of the present invention, there is provided a method of manufacturing a stacked solid electrolytic capacitors which has a structure formed by stacking together a plurality of electrolytic capacitors each comprising an anode portion having a substantially flat plate shape and forming an end portion, and a cathode portion provided at the center of a metal plate. In the aspect of the present invention, the method comprises the steps of preparing at least two of the solid electrolytic capacitors each having a conductive member; connecting the conductive member to each anode portion thereof so as to sandwich two principal surfaces of the anode portion; electrically and mechanically connecting the conductive members of the adjacent solid electrolytic capacitors to each other by the use of one of a conductive adhesive and a solderable metal; and welding them so as to be stacked in layers.

BRIEF DESCRIPTION OF THE DRAWINGS

FIGS. 7A to 7C are diagrams showing another modification of the first preferred embodiment, wherein metal plates are attached to anode portions of a transmission line element according to another method, and wherein FIG. 7A is a plan view of the transmission line element before bending, FIG. 7B is a side view of the transmission line element, seen in a direction A in FIG. 7A, and FIG. 7C is a side view of the transmission line element after bending, seen in the direction A;

DESCRIPTION OF THE PREFERRED EMBODIMENTS

Figure 1:
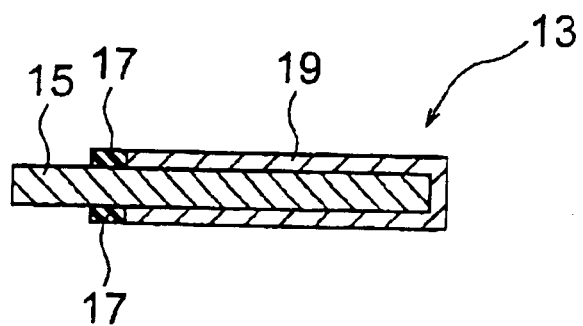
FIG. 1 is a sectional view of a conventional solid electrolytic capacitor element.
Figure 2:
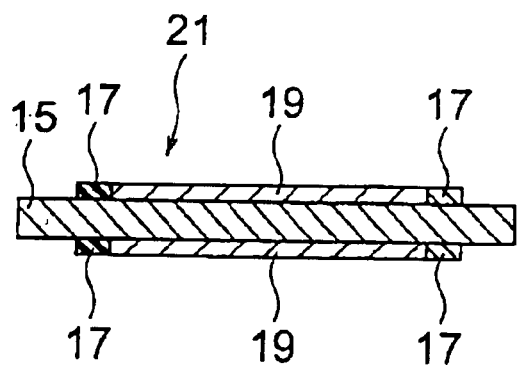
FIG. 2 is a sectional view of a conventional transmission line element.
Figure 3:
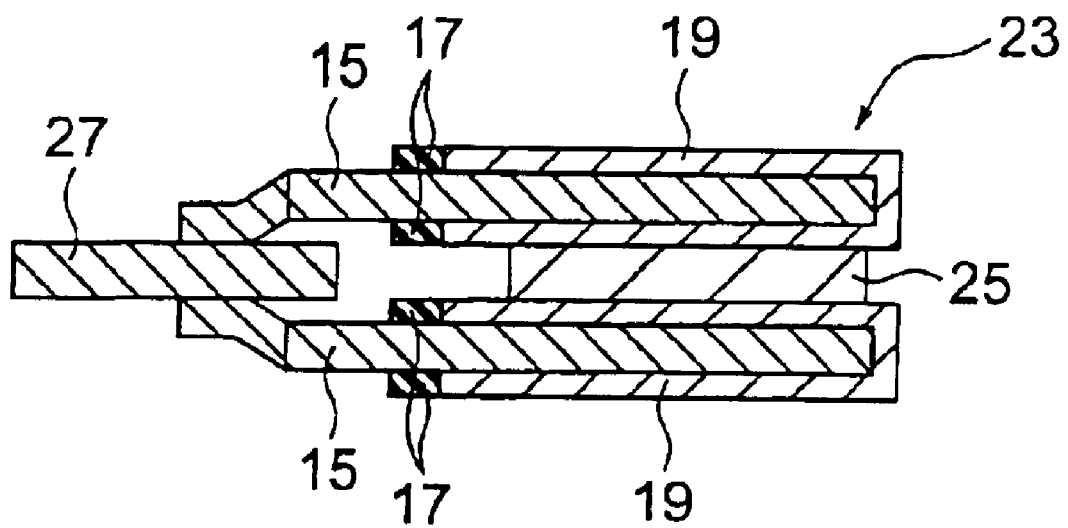
FIG. 3 is a sectional view of a conventional stacked solid electrolytic capacitor.

Prior to describing preferred embodiments of the present invention, description will be made as regards a conventional solid electrolytic capacitor and a conventional transmission line element with reference to FIGS. 1 to 3 for facilitating understanding of the present invention. In FIGS. 1 to 3, the same symbols are given to such portions that are substantially the same.

Referring to FIG. 1, a conventional solid electrolytic capacitor element 13 is configured such that an oxide film is formed on the surface of a valve metal body 15 obtained by roughening, through etching, the surface of a metal plate made of an elementary substance of metal having a valve function, such as aluminum, tantalum, niobium, or titanium, or an alloy thereof, or obtained by integrating together, through sintering, a metal plate having a valve function and metal powder having a valve function, then insulating resin 17 is formed thereon to divide a region into two regions, and then, in the region that will serve as a cathode portion 19, a solid electrolyte layer, a graphite layer, and a silver paste layer, or a solid electrolyte layer, a graphite layer, and a metal plating layer, or a solid electrolyte layer and a metal plating layer are stacked in the order named.

Referring to FIG. 2, a conventional transmission line element 21 is configured such that an oxide film is formed on the surface of a valve metal body 15 obtained by roughening, through etching, the surface of a metal plate made of an elementary substance of metal having a valve function, such as aluminum, tantalum, niobium, or titanium, or an alloy thereof, or obtained by integrating together, through sintering, a metal plate having a valve function and metal powder having a valve function, then insulating resin 17 is formed thereon to divide a region into three regions, and then, in the central region that will serve as a cathode portion 19, a solid electrolyte layer, a graphite layer, and a silver paste layer, or a solid electrolyte layer, a graphite layer, and a metal plating layer, or a solid electrolyte layer and a metal plating layer are stacked in the order named.

For achieving reduction in size, increase in capacity, and reduction in impedance with respect to the foregoing solid electrolytic capacitor element or transmission line element, it is effective to stack a plurality of solid electrolytic capacitor elements or transmission line elements in a thickness direction and electrically connect them together.

FIG. 3 shows a conventional stacked solid electrolytic capacitor 23 disclosed in the foregoing reference 1, wherein cathode portions 19 are connected to each other via a conductive adhesive 25 interposed therebetween, while anode portions are individually joined to a lead frame 27 by resistance welding.

Now, the preferred embodiments of the present invention will be described with reference to FIGS. 4A to 11B.

First Embodiment

Figure 4A:
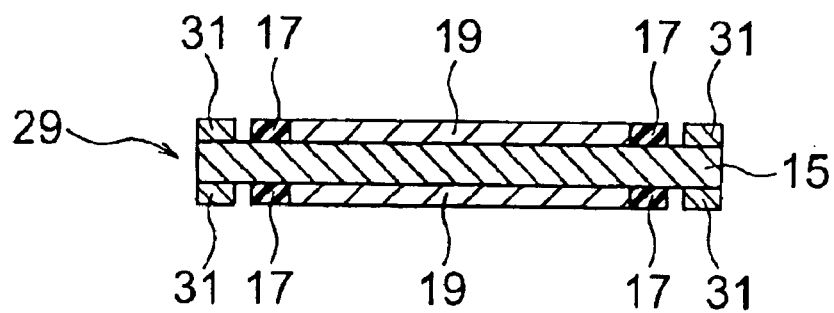
FIG. 4A is a sectional view of a transmission line element according to a first preferred embodiment of the present invention.

FIG. 4A is a sectional view of a transmission line element 29 having an external appearance of a substantially flat plate shape, which is seen in a section passing through two anode portions of the transmission line element 29 and being perpendicular to a principal plane of the transmission line element 29. Metal plates 31 are connected to each of the anode portions of the transmission line element 29 by ultrasonic welding, electric resistance welding, or the like so as to sandwich the anode portion therebetween. In FIG. 4A, the same symbols are given to such portions that are substantially the same as those in FIGS. 1 and 2 showing the prior art.

Figure 4B:
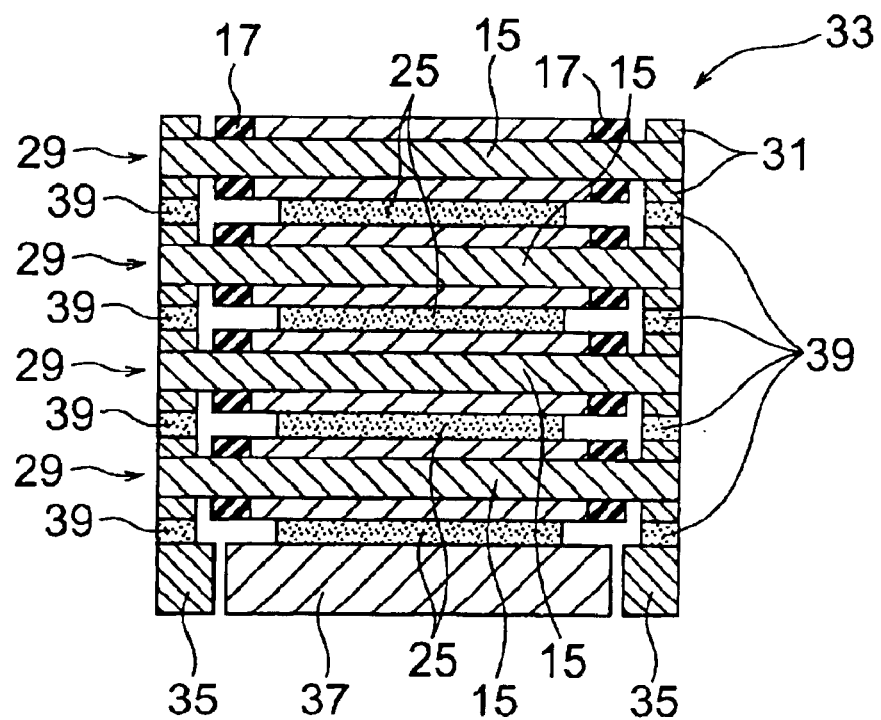
FIG. 4B is a sectional view of a stacked transmission line element according to the first preferred embodiment.

FIG. 4B is a sectional view of a stacked transmission line element 33 having an external appearance of a rectangular parallelepiped shape, which is seen in a section like that of FIG. 4A.

In FIG. 4B, four transmission line elements 29 are stacked in layers. Although the number of the transmission line elements 29 is set to four in this embodiment for the sake of explanation, it may be set to a value greater than four.

Cathode portions 19 of the adjacent upper and lower transmission line elements 29 are connected to each other via conductive adhesives 25 interposed therebetween. At the lowermost layer, anode terminals 35 each in the form of a metal plate are provided at both ends, while a cathode terminal 37 in the form of a metal plate is provided in the center. The cathode terminal 37 is connected to the cathode portion 19 of the lowermost transmission line element 29 via a conductive adhesive 25.

Connection between the adjacent upper and lower anode portions (between the metal plates 31) and connection between each of the lowermost metal plates 31 and the corresponding anode terminal 35 are established via connecting members 39 each in the form of a conductive adhesive or solderable metal. The metal plates 31 are made of highly conductive metal such as copper. A surface of each metal plate 31, which is welded to the anode portion, may be plated with metal having a low melting point, such as tin. On the other hand, a surface of each metal plate 31, which is connected to the adjacent metal plate 31, may be plated with metal such as silver excellent in adhesion to the conductive adhesive when they are connected via the conductive adhesive, or may be plated with metal compatible with the solderable metal when they are connected via the solderable metal.

Figure 5:
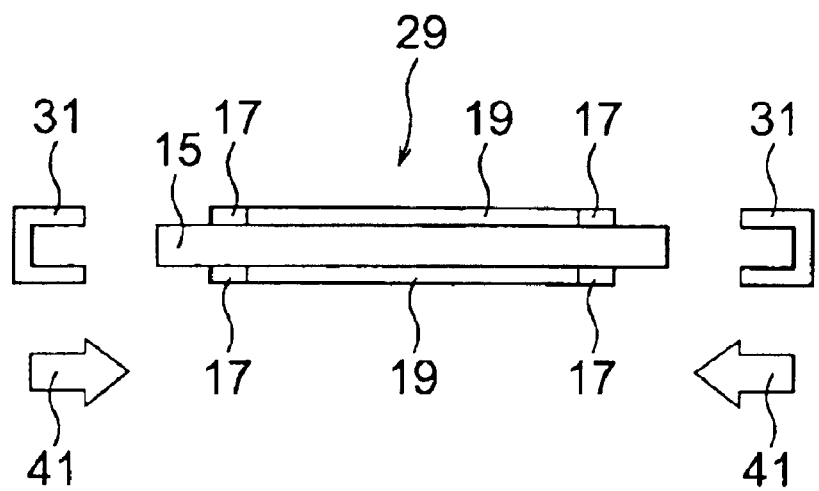
FIG. 5 is a front view of a transmission line element, showing a modification of the first preferred embodiment, wherein metal plates are attached to anode portions of the transmission line element according to another method.

Apart from the foregoing method wherein the two metal plates 31 are connected to each anode portion so as to sandwich it from the upper and lower surfaces thereof, there is another method as shown in FIG. 5 wherein a bent metal plate 31 is fitted to each anode portion as indicated by an arrow 41 so as to sandwich it from the upper and lower surfaces thereof, then the anode portion and the bent metal plate 31 are electrically connected together by ultrasonic welding, electric resistance welding, or the like. Incidentally, when such a bent metal plate 31 is used, a sectional shape thereof at the anode portion becomes a U-shape which slightly differs from that in FIG. 4A or 4B.

Figure 6:
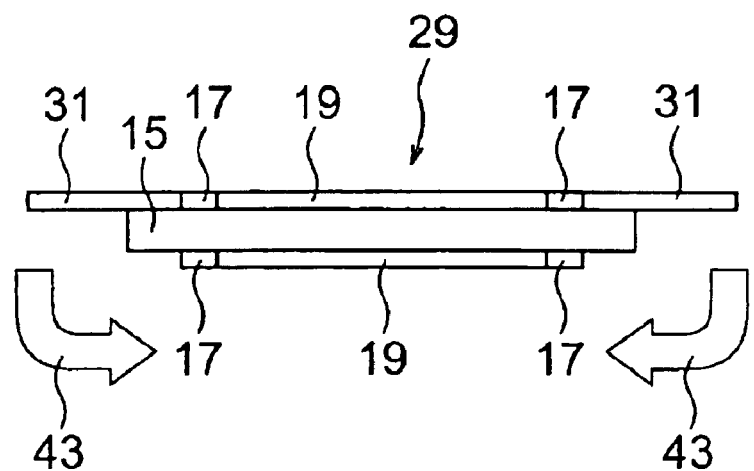
FIG. 6 is a front view of a transmission line element, showing another modification of the first preferred embodiment, wherein metal plates are attached to anode portions of the transmission line element according to another method.

As shown in FIG. 6, there is still another method wherein a strip-shaped metal plate 31 having a width substantially equal to that of the anode portion is electrically connected to the anode portion by ultrasonic welding, electric resistance welding, or the like so as to be projected in a longitudinal direction of the transmission line element 29, and then is bent as indicated by an arrow 43.

Figure 7A:
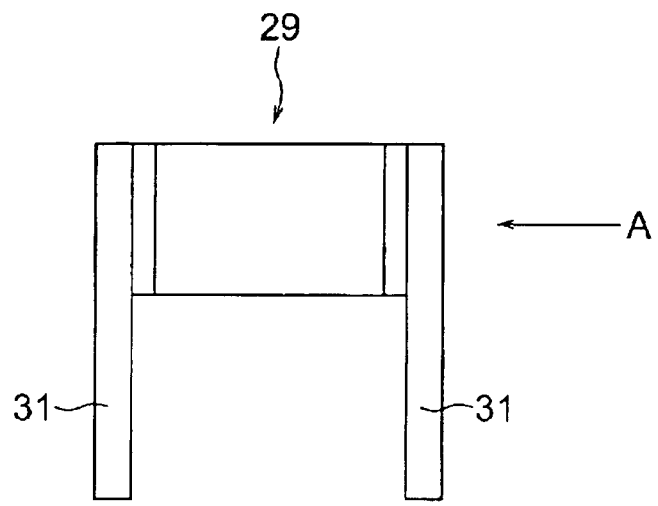
Figure 7B:
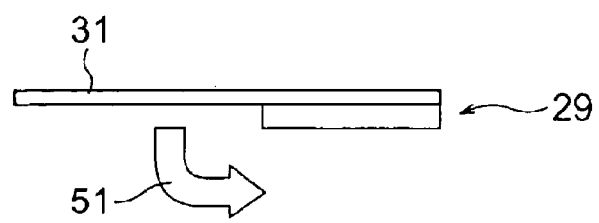
Figure 7C:
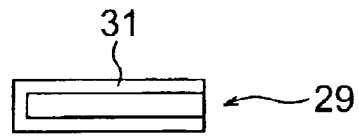

Moreover, it is also possible to employ another method wherein a belt-like metal plate 31 longer than the width of the anode portion is electrically connected to the anode portion by ultrasonic welding, electric resistance welding, or the like as shown in a plan view of FIG. 7A, then is bent so as to wrap the anode portion as indicated by an arrow 51 shown in a side view of FIG. 7B, thereby to obtain the transmission line element 29 as shown in a side view of FIG. 7C. An arrow A in FIG. 7A represents a direction in which the transmission line element 29 is seen when describing FIGS. 7B and 7C.

Connection between the metal plates 31 and connection between the metal plate 31 and the anode terminal 35 can also be achieved by welding other than the foregoing connecting members 39 each in the form of the conductive adhesive or solderable metal.

Figure 8A:
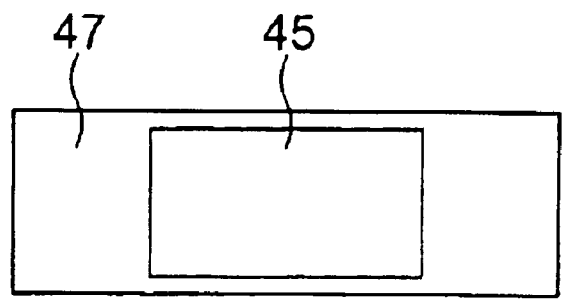
FIG. 8A is a plan view of an adhesive insulating sheet having a hollowed portion according to another modification of the first preferred embodiment.
Figure 8B:
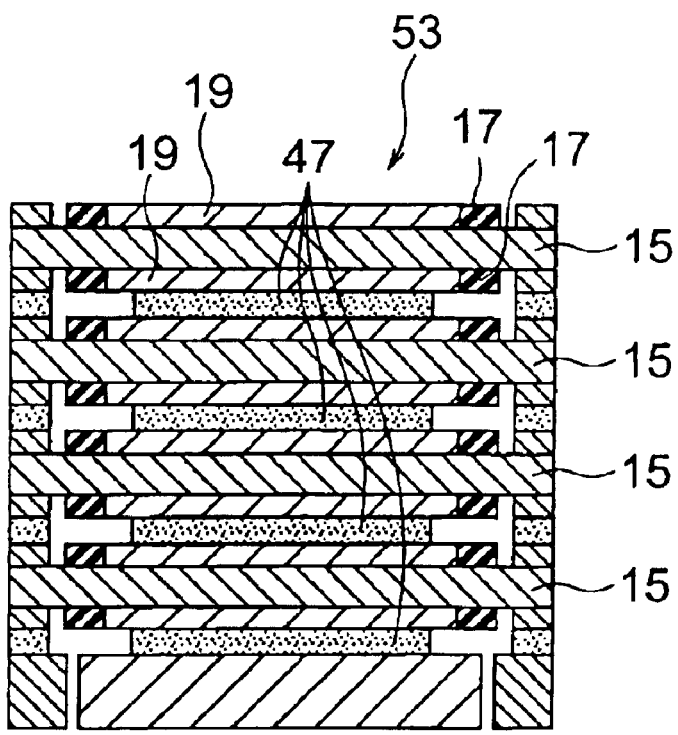
FIG. 8B is a sectional view of a stacked transmission line element according to the modification of the first preferred embodiment, wherein adhesive insulating sheets each as shown in FIG. 8A are used.

The method of connecting between the adjacent cathode portions 19 and between the cathode portion 19 and the cathode terminal 37 by the use of the conductive adhesives 25 has been described above. Apart from such a method, it is also effective to employ a method wherein adhesive insulating sheets 47 each having a hollowed portion 45 of a predetermined shape as shown in FIG. 8A are used and, by filling a conductive adhesive in the hollowed portions 45 of the respective sheets 47, connection between the adjacent cathode portions 19 and connection between the cathode portion 19 and the cathode terminal 37 are established so that a stacked transmission line element 53 is formed as shown in FIG. 8B.

Figure 9A:
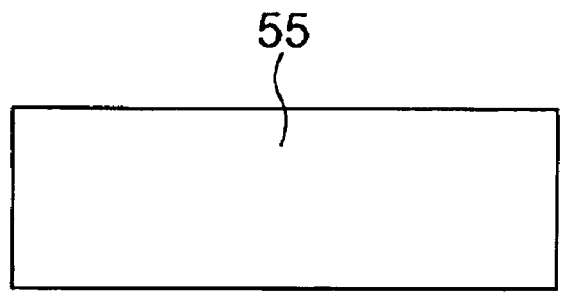
FIG. 9A is a plan view of an adhesive insulating sheet having no hollowed portion according to another modification of the first preferred embodiment.
Figure 9B:
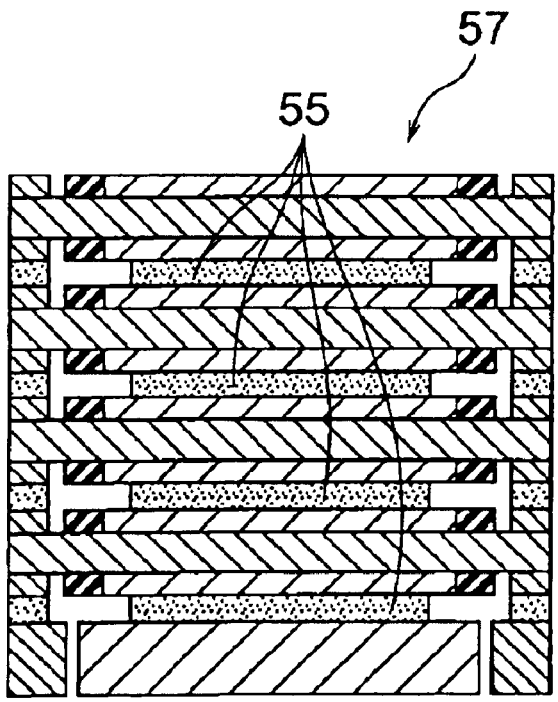
FIG. 9B is a sectional view of a stacked transmission line element according to the modification of the first preferred embodiment, wherein adhesive insulating sheets each as shown in FIG. 9A are used.

Further, it is also possible to employ a method wherein adhesive insulating sheets 55 each having no hollowed portion and each as shown in FIG. 9A are interposed between the adjacent cathode portions 19 and between the cathode portion 19 and the cathode terminal 37 to thereby achieve adhesion therebetween, then a conductive adhesive is applied to side surfaces of the cathode portions 19 and the cathode terminal 37, which are parallel to the surface of the sheet of FIG. 9B, so as to establish electrical connection therebetween to thereby form a stacked transmission line element 57 as shown in FIG. 9B.

The foregoing description has been given about the stacked transmission line elements. However, like structures are also applicable to stacked solid electrolytic capacitors. As appreciated, a difference between the stacked transmission line element and the stacked solid electrolytic capacitor resides in whether the anode portions are provided on both sides or only one side.

Second Embodiment

Now, the second preferred embodiment of the present invention will be described hereinbelow.

Figure 10A:
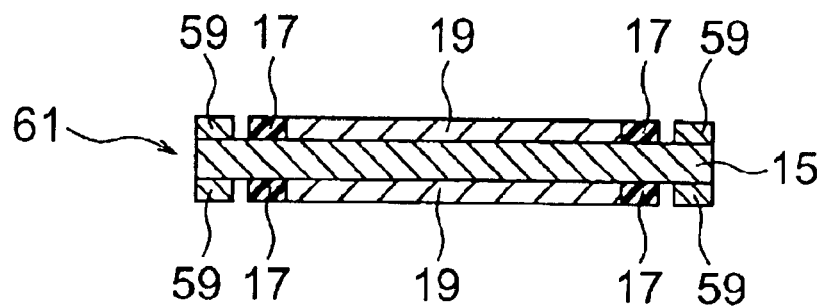
FIG. 10A is a sectional view of a transmission line element according to a second preferred embodiment of the present invention.

Referring to FIG. 10A, metal plating layers 59 are formed on both principal surfaces of each of anode portions of a transmission line element 61.

Figure 10B:
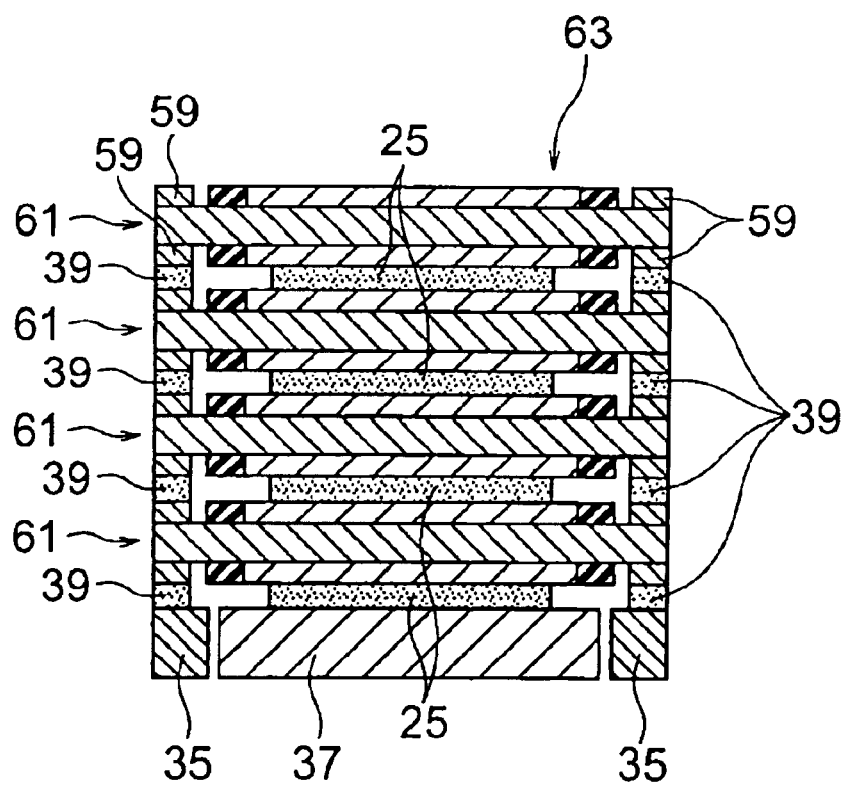
FIG. 10B is a sectional view of a stacked transmission line element according to the second preferred embodiment.

Referring to FIG. 10B, four transmission line elements 61 are stacked in layers to thereby form a stacked transmission line element 63. Although the number of the transmission line elements 61 is set to four in this embodiment for the sake of explanation, it may be set to a value greater than four.

Cathode portions 19 of the adjacent upper and lower transmission line elements 61 are connected to each other via conductive adhesives 25 interposed therebetween. At the lowermost layer, anode terminals 35 each in the form of a metal plate are provided at both ends, while a cathode terminal 37 in the form of a metal plate is provided in the center. The cathode terminal 37 is connected to the cathode portion 19 of the lowermost transmission line element 61 via a conductive adhesive 25.

Connection between the adjacent upper and lower anode portions (between the metal plating layers 59) and connection between each of the lowermost metal plating layers 59 and the corresponding anode terminal 35 are established via connecting members 39 each in the form of a conductive adhesive or solderable metal. Connection between the metal plating layers 59 and connection between the metal plating layer 59 and the anode terminal 35 can also be achieved by welding other than the connecting members 39.

Also in this embodiment, the methods of connection between the cathode portions and between the cathode portion and the cathode terminal as described in the modifications of the first preferred embodiment are applicable.

Further, a stacked solid electrolytic capacitor is also applicable with a structure like that of the stacked transmission line element as described in this embodiment.

Third Embodiment

Now, the third preferred embodiment of the present invention will be described hereinbelow.

Figure 11A:
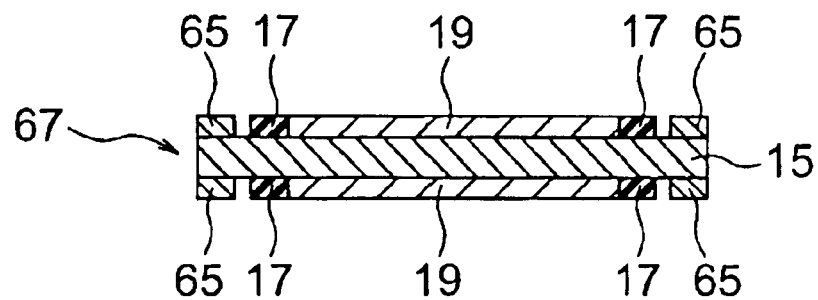
FIG. 11A is a sectional view of a transmission line element according to a third preferred embodiment of the present invention.

Referring to FIG. 11A, conductive paste layers 65 are formed on both principal surfaces of each of anode portions of a transmission line element 67.

Figure 11B:
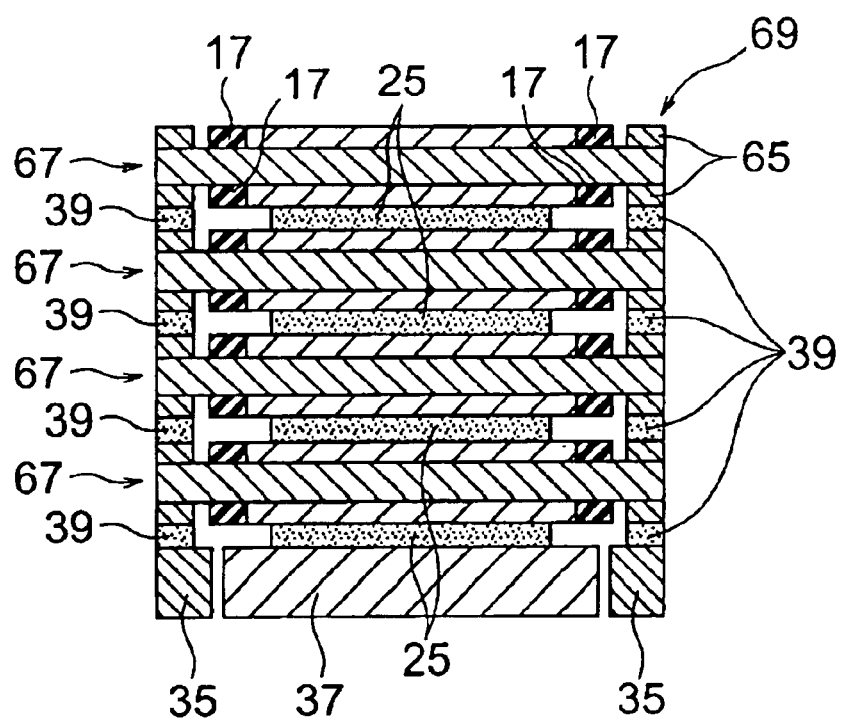
FIG. 11B is a sectional view of a stacked transmission line element according to the third preferred embodiment.

Referring to FIG. 11B, four transmission line elements 67 are stacked in layers to thereby form a stacked transmission line element 69. Although the number of the transmission line elements 67 is set to four in this embodiment for the sake of explanation, it may be set to a value greater than four.

Cathode portions 19 of the adjacent upper and lower transmission line elements 67 are connected to each other via conductive adhesives 25 interposed therebetween. At the lowermost layer, anode terminals 35 each in the form of a metal plate are provided at both ends, while a cathode terminal 37 in the form of a metal plate is provided in the center. The cathode terminal 37 is connected to the cathode portion 19 of the lowermost transmission line element 67 via a conductive adhesive 25.

Connection between the adjacent upper and lower anode portions (between the conductive paste layers 65) and connection between each of the lowermost conductive paste layers 65 and the corresponding anode terminal 35 are established via connecting members 39 each in the form of a conductive adhesive or solderable metal.

Also in this embodiment, the methods of connection between the cathode portions and between the cathode portion and the cathode terminal as described in the modifications of the first preferred embodiment are applicable. Further, a stacked solid electrolytic capacitor is also applicable with a structure like that of the stacked transmission line element of this embodiment.

Fourth Embodiment

Figure 12B:
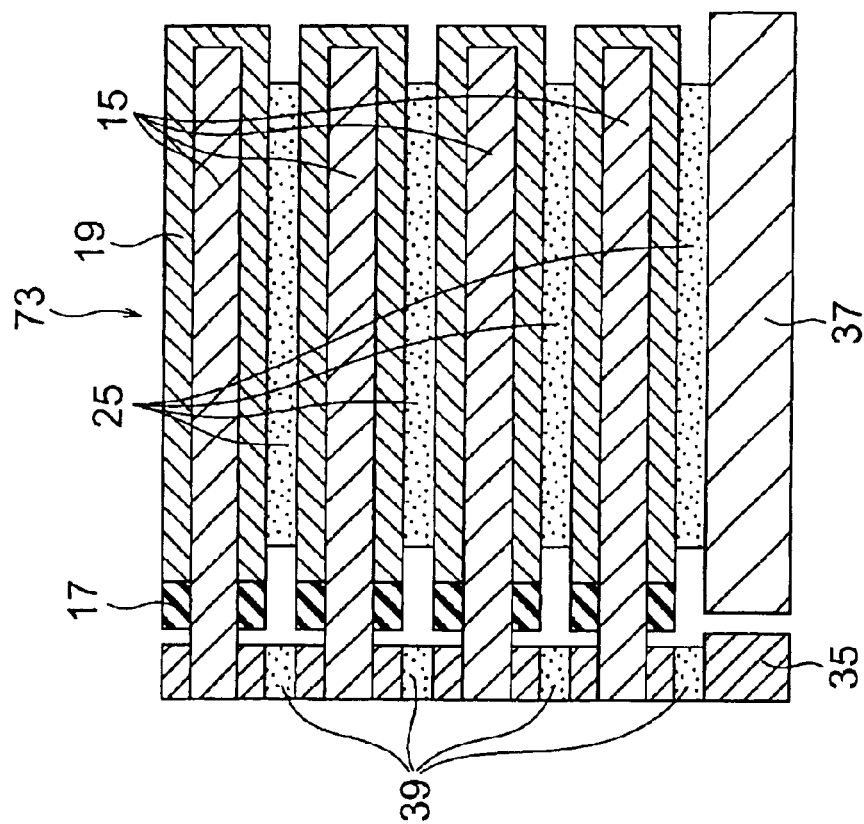
FIG. 12B is a sectional view of a stacked solid electrolytic capacitor element according to the fourth preferred embodiment.
Figure 12A:
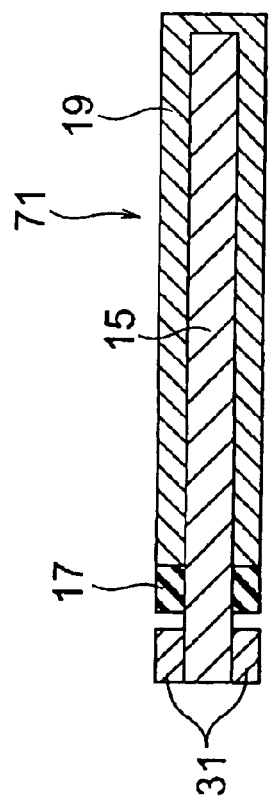
FIG. 12A is a sectional view of a solid electrolytic capacitor element according to a fourth preferred embodiment of the present invention.

FIG. 12A is a sectional view of a solid electrolytic capacitor element 71 having an external appearance of a substantially flat plate shape, which is seen in a section passing through an anode portion of the solid electrolytic capacitor element 71 and being perpendicular to a principal plane of the solid electrolytic capacitor element 71. Metal plates 31 are connected to the anode portion of the solid electrolytic capacitor element 71 by ultrasonic welding, electric resistance welding, or the like so as to sandwich the anode portion therebetween. In FIG. 12A, the same symbols are given to such portions that are substantially the same as those in FIGS. 1 and 2 showing the prior art and FIGS. 4A to 11B showing the preferred embodiments 1 to 3.

FIG. 12B is a sectional view of a stacked solid electrolytic capacitor element 73 having an external appearance of a rectangular parallelepiped shape, which is seen in a section like that of FIG. 12A.

In FIG. 12B, four solid electrolytic capacitor elements 71 are stacked in layers. Although the number of the solid electrolytic capacitor elements 71 is set to four in this embodiment for the sake of explanation, it may be set to a value greater than four.

Cathode portions 19 of the adjacent upper and lower solid electrolytic capacitor elements 71 are connected to each other via conductive adhesives 25 interposed therebetween. At the lowermost layer, an anode terminal 35 in the form of a metal plate is provided at one end, while a cathode terminal 37 in the form of a metal plate is provided in the center. The cathode terminal 37 is connected to the cathode portion 19 of the lowermost transmission line element 29 via a conductive adhesive 25.

Connection between the adjacent upper and lower anode portions (between the metal plates 31) and connection between each of the lowermost metal plates 31 and the corresponding anode terminal 35 are established via connecting members 39 each in the form of a conductive adhesive or solderable metal. The metal plates 31 are made of highly conductive metal such as copper. A surface of each metal plate 31, which is welded to the anode portion, may be plated with metal having a low melting point, such as tin. On the other hand, a surface of each metal plate 31, which is connected to the adjacent metal plate 31, may be plated with metal such as silver excellent in adhesion to the conductive adhesive when they are connected via the conductive adhesive, or may be plated with metal compatible with the solderable metal when they are connected via the solderable metal.

Apart from the foregoing method wherein the two metal plates 31 are connected to the anode portion so as to sandwich it from the upper and lower surfaces thereof, another method is possible as described before in conjunction with FIG. 5 wherein a bent metal plate 31 is fitted to each anode portion as indicated by an arrow 41 so as to sandwich it from the upper and lower surfaces thereof, then the anode portion and the bent metal plate 31 are electrically connected together by ultrasonic welding, electric resistance welding, or the like. Incidentally, when such a bent metal plate 31 is used, a sectional shape thereof at the anode portion becomes a U-shape which slightly differs from that in FIG. 12A or 12B.

As described in connection with FIG. 6, there is still another method wherein a strip-shaped metal plate 31 having a width substantially equal to that of the anode portion is electrically connected to the anode portion by ultrasonic welding, electric resistance welding, or the like so as to be projected in a longitudinal direction of the transmission line element 29, and then is bent as indicated by an arrow 43.

Moreover, it is also possible to employ another method wherein a belt-like metal plate 31 longer than the width of the anode portion is electrically connected to the anode portion by ultrasonic welding; electric resistance welding, or the like as described in relation to FIG. 7A, then is bent so as to wrap the anode portion as indicated by an arrow 51 shown in a side view of FIG. 7B, thereby to obtain the solid electrolytic capacitor element 71 in the similar manner described in conjunction with FIG. 7C.

Connection between the metal plates 31 and connection between the metal plate 31 and the anode terminal 35 can also be achieved by welding other than the foregoing connecting members 39 each in the form of the conductive adhesive or solderable metal.

The method of connecting between the adjacent cathode portions 19 and between the cathode portion 19 and the cathode terminal 37 by the use of the conductive adhesives 25 has been described above. Apart from such a method, it is also effective to employ a method wherein adhesive insulating sheets 47 each having a hollowed portion 45 of a predetermined shape as described before in connection with FIG. 8A are used and, by filling a conductive adhesive in the hollowed portions 45 of the respective sheets 47, connection between the adjacent cathode portions 19 and connection between the cathode portion 19 and the cathode terminal 37 are established so that a stacked transmission line element 53 is formed as described before in connection with FIG. 8B.

Further, it is also possible to employ a method wherein adhesive insulating sheets 55 each having no hollowed portion and each as shown in FIG. 9A are interposed between the adjacent cathode portions 19 and between the cathode portion 19 and the cathode terminal 37 to thereby achieve adhesion therebetween, then a conductive adhesive is applied to side surfaces of the cathode portions 19 and the cathode terminal 37, which are parallel to the surface of the sheet of FIG. 9B, so as to establish electrical connection therebetween to thereby form a stacked solid electrolytic capacitor element 73 in a similar manner to form a stacked transmission line element 57 as described before in relation to FIG. 9B.

In the similar manner described before as regards the stacked transmission line elements, like structures are also applicable to stacked solid electrolytic capacitors. As appreciated, a difference between the stacked transmission line element and the stacked solid electrolytic capacitor resides in whether the anode portions are provided on both sides or only one side.

As described above, according to any of the first to fourth preferred embodiments and the modifications thereof, the stacked solid electrolytic capacitor or the stacked transmission line element with the reduced size, the increased capacity, and the reduced impedance can be realized, which has the structure wherein stresses are not concentrated to the anode portions thereof.

As described above, according to the present invention, it is possible to provide the stacked solid electrolytic capacitor and the stacked transmission line element each preventing deformation of the anode portions thereof and thus preventing degradation of the characteristic thereof caused by such deformation, even in case of the multi-stacked structure.

Although this invention has been described in connection with a few preferred embodiments thereof, it will readily be understood for those skilled in the art that this invention may be modified in various other manners within the scope of the appended claims.

What is claimed is:

1. A stacked solid electrolytic capacitor formed by stacking together at least two solid electrolytic capacitor elements each having a substantially flat plate shape, each of said solid electrolytic capacitor elements comprising:
    a plate-like anode portion as one end portion,
    a cathode portion divided from said anode portion by an insulator, and
    a U-shaped conductive member fitted to an end of the anode portion so as to contact two principal surfaces of said anode portion, and
    wherein said conductive members of adjacent solid electrolytic capacitor elements are electrically and mechanically connected to each other by one of a conductive adhesive, a solderable metal, and welding so as to be stacked in layers.

2. The stacked solid electrolytic capacitor according to claim 1, wherein each of said conductive members comprises one of a metal plate, a metal plating layer, and a conductive paste layer.

3. The stacked solid electrolytic capacitor according to claim 1, wherein said cathode portions of the adjacent solid electrolytic capacitor elements are connected to each other by a conductive adhesive so as to be stacked in layers.

4. The stacked solid electrolytic capacitor according to claim 1, wherein each of said solid electrolytic capacitor elements is formed by:
    forming an oxide film on one of: (i) a flat plate-shaped metal having a roughened surface and a valve function, and (ii) a sintered body made of a metal plate having a valve function and metal powder having a valve function and formed on said metal plate,
    then forming a solid electrolyte layer at a predetermined portion that will serve as said cathode portion, and
    then forming a graphite layer and one of a silver paste layer and a metal plating layer on said solid electrolyte layer.

5. The stacked solid electrolytic capacitor according to claim 1, wherein each of said solid electrolytic capacitor elements is formed by:
    forming an oxide film on one of: (i) a flat plate-shaped metal having a roughened surface and a valve function, and (ii) a sintered body made of a metal plate having a valve function and metal powder having a valve function and formed on said metal plate,
    then forming a solid electrolyte layer at a predetermined portion that will serve as said cathode portion, and
    then forming a metal plating layer on said solid electrolyte layer.

6. The stacked solid electrolytic capacitor according to claim 1, wherein said cathode portions of the adjacent solid electrolytic capacitor elements are adhered to each other by an adhesive insulating sheet so as to be stacked in layers, and are electrically connected to each other by a conductive adhesive on side surfaces of said cathode portions.

7. A stacked solid electrolytic capacitor formed by stacking together at least two solid electrolytic capacitor elements each having a substantially flat plate shape, each of said solid electrolytic capacitor elements comprising:
    a plate-like anode portion as one end portion,
    a cathode portion divided from said anode portion by an insulator, and
    a conductive member connected to the anode portion so as to contact two principal surfaces of said anode portion,
    wherein said conductive members of adjacent solid electrolytic capacitor elements are electrically and mechanically connected to each other by one of a conductive adhesive, a solderable metal, and welding so as to be stacked in layers, and wherein said cathode portions of the adjacent solid electrolytic capacitor elements are connected to each other by an adhesive insulating sheet having a hollowed portion and a conductive adhesive filled in said hollowed portion, so as to be stacked in layers.

8. The stacked solid electrolytic capacitor according to claim 7, wherein said cathode portions of the adjacent solid electrolytic capacitor elements are adhered to each other by an adhesive insulating sheet so as to be stacked in layers, and are electrically connected to each other by a conductive adhesive on side surfaces of said cathode portions.

9. A stacked transmission line element formed by stacking together a plurality of transmission line elements each of said plurality of transmission line elements comprising:

two substantially flat, plate-shaped anode portions as end portions thereof, a cathode portion provided between said anode portions, and a U-shaped conductive member fitted to an end portion of each anode portion so as to contact two principal surfaces of said anode portion, wherein said conductive members of adjacent transmission line elements are electrically and mechanically connected to each other by one of a conductive adhesive, a solderable metal, and welding so as to be stacked in layers.

10. The stacked transmission line element according to claim 9, wherein each of said conductive members comprises one of a metal plate, a metal plating layer, and a conductive paste layer.

11. The stacked transmission line element according to claim 9, wherein said cathode portions of the adjacent transmission line elements are connected to each other by a conductive adhesive so as to be stacked in layers.

12. The stacked transmission line element according to claim 9, wherein each of said transmission line elements is formed by:

forming an oxide film on one of: (i) a flat plate-shaped metal having a roughened surface and a valve function, and (ii) a sintered body made of a metal plate having a valve function and metal powder having a valve function and formed on said metal plate, then forming a solid electrolyte layer at a predetermined portion that will serve as said cathode portion, and then forming a graphite layer and one of a silver paste layer and a metal plating layer on said solid electrolyte layer.

13. The stacked transmission line element according to claim 9, wherein each of said transmission line elements is formed by:

forming an oxide film on one of: (i) a flat plate-shaped metal having a roughened surface and a valve function, and (ii) a sintered body made of a metal plate having a valve function and metal powder having a valve function and formed on said metal plate, then forming a solid electrolyte layer at a predetermined portion that will serve as said cathode portion, and then forming a metal plating layer on said solid electrolyte layer.

14. The stacked transmission line element according to claim 9, wherein said cathode portions of the adjacent transmission line elements are adhered to each other by an adhesive insulating sheet so as to be stacked in layers, and are electrically connected to each other by a conductive adhesive on side surfaces of said cathode portions.

15. Stacked transmission line element formed by stacking together a plurality of transmission line elements, each of said plurality of transmission line elements comprising:

two substantially flat plate-shaped anode portions as end portions thereof, a cathode portion provided between said anode portions, and a conductive member connected to each anode portion so as to contact two principal surfaces of said anode portion, wherein said conductive members of adjacent transmission line elements are electrically and mechanically connected to each other by one of a conductive adhesive, a solderable metal, and welding so as to be stacked in layers, and wherein said cathode portions of the adjacent transmission line elements are connected to each other by an adhesive insulating sheet having a hollowed portion and a conductive adhesive filled in said hollowed portion, so as to be stacked in layers.

16. The stacked transmission line element according to claim 15, wherein said cathode portions of the adjacent transmission line elements are adhered to each other by an adhesive insulating sheet so as to be stacked in layers, and are electrically connected to each other by a conductive adhesive on side surfaces of said cathode portions.

17. A method of manufacturing a stacked transmission line element comprising a plurality of stacked transmission line elements each comprising two substantially flat plate-shaped anode portions as end portions thereof, and a cathode portion provided between said anode portions, said method comprising:

preparing at least two said transmission line elements;

fitting a conductive member to an end of each anode portion so as to contact two principal surfaces of said anode portion; and electrically and mechanically connecting said conductive members of adjacent transmission line elements to each other by one of a conductive adhesive, a solderable metal, and welding so as stack the at least two transmission line element in layers.

18. A method of manufacturing a stacked solid electrolytic capacitor having a structure comprising a plurality of stacked electrolytic capacitors each comprising a substantially flat plate-shaped anode portion as an end portion thereof, and a cathode portion, said method comprising:

preparing at least two said solid electrolytic capacitors;

fitting a conductive member to an end of each anode portion so as to contact two principal surfaces of said anode portion; and electrically and mechanically connecting said conductive members of adjacent solid electrolytic capacitors to each other by one of a conductive adhesive, a solderable metal, and welding so as to stack the at least two solid electrolytic capacitors in layers.

* * * * *